Oct. 30, 1962 J. L. WIRTH 3,061,676

SOUND REPRODUCING DEVICE

Filed Feb. 5, 1959 2 Sheets-Sheet 1

Inventor
John L. Wirth

Graf, Nierman & Burmeister
Attorneys

Oct. 30, 1962 J. L. WIRTH 3,061,676

SOUND REPRODUCING DEVICE

Filed Feb. 5, 1959 2 Sheets-Sheet 2

Inventor

John L. Wirth

Graf, Nierman & Burmeister

Attorneys

United States Patent Office 3,061,676

Patented Oct. 30, 1962

3,061,676
SOUND REPRODUCING DEVICE

John L. Wirth, Three Oaks, Mich., assignor to Electro-Voice, Incorporated, Buchanan, Mich., a corporation of Indiana Filed Feb. 5, 1959, Ser. No. 791,354
14 Claims. (Cl. 179—1)

The present invention relates to sound reproducing devices and particularly to loudspeaker-amplifier coupling devices.

Vacuum tube audio power amplifiers are essentially constant voltage sources, particularly since most audio amplifiers employ negative voltage feedback. As a result, the power delivered to a loudspeaker connected to the output of a power amplifier is inversely proportional to the real part of the loudspeaker terminal impedance. More power will be delivered to the speaker if the terminal impedance is low and real. However, there is a practical lower limit to the permissible loudspeaker impedance, and lowering the impedance below this value results in decreasing the total maximum power available from the audio amplifier. The distortion content of the amplifier output is also increased. Power amplifiers are therefore designed to operate with a specified load impedance hereafter referred to as the amplifier's nominal load impedance.

Unfortunately, the terminal impedance of a dynamic loudspeaker varies with frequency. Thus, exact matching of the loudspeaker terminal impedance to the nominal load impedance of the amplifier at all frequencies is not possible. A dynamic loudspeaker exhibits an impedance peak at the frequency of cone resonance, and an increasing impedance in the upper portion of its frequency range.

It is one of the objects of the present invention to provide an electroacoustical device of relatively constant terminal impedance throughout its operating frequency range which may be directly coupled to the output of an audio amplifier.

It is also an object of the present invention to provide a coupling network which may be electrically connected in series between the output of the audio amplifier and a dynamic loudspeaker such that the input impedance to the coupling network is much more nearly constant than the terminal impedance of the loudspeaker.

Further, it is an object of the present invention to provide a coupling network which may be connected in series with an audio amplifier and dynamic loudspeaker which provides an adjustable input impedance whereby the amount of power dissipated by the loudspeaker in the frequency ranges affected by the coupling network may be varied.

The combination of an audio power amplifier, dynamic loudspeaker, and coupling network meeting the objects of the present invention achieves greater power output at frequencies at which the terminal impedance of the loudspeaker exceeds the nominal impedance of the amplifier. The variable impedance coupling network also provides adjustment to suit each particular unit.

Further objects and advantages of the present invention will be apparent from a further consideration of this disclosure, particularly when viewed in the light of the drawings, in which.

Figure 1:
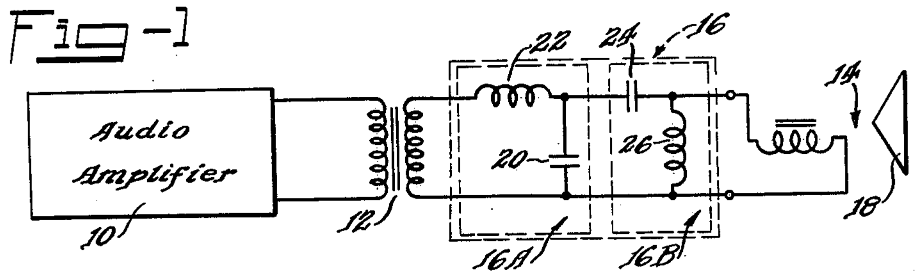
FIGURE 1 is a schematic electrical circuit diagram of a sound reproducing device constructed acording to the teachings of the present invention.

In FIGURE 1, an audio amplifier 10 is illustrated coupled to its output transformer 12. The audio amplifier 10 is a conventional vacuum tube power amplifier provided with negative voltage feedback, and constitutes essentially a constant voltage source, that is, the power output of the amplifier 10 is inversely proportional to the impedance of the load connected thereto and independent of the frequency throughout the operating range. A loudspeaker 14 is coupled to the output of the transformer 12 through a coupling network 16. The loudspeaker 14 is a conventional dynamic loudspeaker and has a cone 18.

Figure 2:
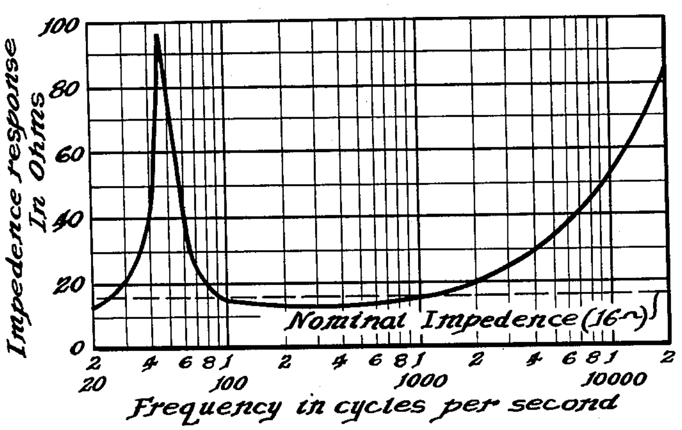
FIGURE 2 is a graph illustrating the terminal impedance of a typical dynamic loudspeaker throughout its frequency range.

The coupling network 16 is designed to achieve an input impedance to the network with the speaker connected which is approximately constant and real throughout the operating frequency range of the sound reproducing device. As illustrated in FIGURE 2, the impedance of the loudspeaker 14 rises as the frequency increases above approximately 1000 cycles per second, the loudspeaker acting more or less like an inductor. The coupling network 16 has a portion designated 16A designed to resonate with this inductive reactance in a manner such that the terminal impedance of the combined matching network and loudspeaker is relatively constant. This portion 16A of the coupling network 16 employs a capacitor 20 connected in parallel with the loudspeaker 14, and an inductor 22 connected in series with this parallel combination. The inductor 22 and the parallel combination of the capacitor and the loudspeaker 14 form a series resonant circuit in the portion of the frequency range in which the speaker demonstrates a terminal impedance which rises with frequency. The series resonant frequency of the inductor and the parallel combination of the loudspeaker 14 and the capacitor is preferably chosen at approximately the high frequency limit of the speaker without a coupling network between the loudspeaker 14 and the audio amplifier 10. Since a series resonant circuit has a low, real terminal impedance at resonance, substantially more power is delivered to the combination of the speaker and coupling network, and hence to the speaker than would be were the coupling network not employed, since the coupling network is composed of non-dissipative components.

Figure 3:
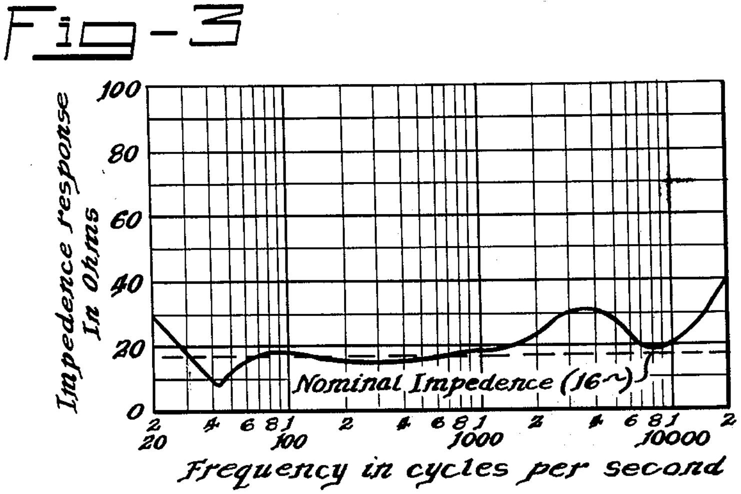
FIGURE 3 is a graph illustrating the impedance measured across the input terminals of the matching network illustrated in FIGURE 1 throughout the frequency range of the loudspeaker.

In one particular construction of the present invention the terminal impedance of the loudspeaker 14 is as indicated in FIGURE 2, and the capacitor 20 has a value of 1.5 microfarads and the inductor 22 has a value of .23 millihenry. With these particular values, the impedance of the combined speaker 14 and coupling network 16 varied above 1000 cycles per second as shown in FIGURE 3. The nominal terminal impedance of the loudspeaker 14 is 16 ohms, and this is approximately the impedance of the loudspeaker throughout the portion of its operating frequency range from 100 cycles per second to 1000 cycles per second.

Conventional crossover networks employed between the output of an amplifier and two or more loudspeakers also employ a combination of high and low pass filters; however, the components of such networks result in a different mode of operation. A low pass filter for a crossover network is designed to prevent high frequency audio signals from being impressed on a low frequency, or woofer speaker, and results in a loss in current through the speaker with the filter in the circuit over the current through the speaker without the filter in the circuit. A low pass filter constructed according to the teachings of the present invention, however, results in a speaker current gain at the resonant frequency with the filter in the circuit over the current which exists without the filter in the circuit. The current gain, B, is given by the following equation:

$$B=\frac{(R_S+R_A+jX_S)\left(\frac{-j}{\omega C}\right)}{(R_A+R_L)R_S-X_S\left(\omega L-\frac{1}{\omega C}\right)+\frac{L}{C}+j\left[R_S\left(\omega L-\frac{1}{\omega C}\right)+(R_A+R_L)\left(X_S-\frac{1}{\omega C}\right)\right]}$$

where $R_S$ is the resistance of the speaker, $X_S$ is the reactance of the speaker, $R_A$ the amplifier output impedance, $R_L$ is the inductor resistance, C is the capacitance, L is the inductance, $j$ is the imaginary operator, and $\omega$ is $2\pi$ times the frequency.

It is clear that at resonance the current gain neglecting the amplifier and inductor resistance can be simplified to $$B=\frac{Z_S}{\sqrt{\frac{L}{C}}}$$

where $Z_S$ is a loudspeaker terminal impedance, since at this frequency $$\omega L-\frac{1}{\omega C}=0$$

Filters for conventional crossover networks are designed to have a ratio of $L/C$ equal to or greater than the square of the nominal speaker impedance, $R^2$. Thus, a well known commercial low pass filter for a 16 ohm woofer employs a capacitor of 2.84 microfarads and an inductance of 0.73 millihenry, resulting in an $L/C$ of 257, which is approximately equal to $R^2$ which is 256. An impedance matching network constructed according to the teachings of the present invention, however, for the same speaker, using the values set forth above, has an $L/C$ ratio of 153, which is approximately ⅗ of $R^2$.

The inventor has found that an impedance matching network will produce a significant speaker current gain at resonance if $$\frac{L}{C}<0.8R^2$$

If the ratio of L to C exceeds this value appreciably, there will be a current loss in the loudspeaker with the network over the current in the speaker without the network.

As indicated in FIGURE 2, there is a sharp peak in the terminal impedance plot in the lower regions of the frequency spectrum. For the loudspeaker and conditions from which FIGURE 2 was obtained, this peak occurred at approximately 45 cycles per second. This peak results from a resonant condition involving the mass of the loudspeaker cone 18 and the compliance of the cone's supporting material and media, and is generally referred to as the frequency of cone resonance. The coupling network 16 employs a section 16B connected in cascade with the section 16A and the loudspeaker 14 for compensating for this impedance peak. The section 16B of the coupling network 16 employs a capacitor 24 connected in series with the parallel combination of the loudspeaker 14 and an inductor 26. A series resonant condition involving the capacitor 24 and the parallel combination of the loudspeaker 14 and the inductor 26 compensates for this impedance peak. Suitable values for the capacitor 24 and the inductor 26 could be of the order of 150 microfarads and 40 millihenrys, respectively.

Again, the ratio $L/C$ must be less than $0.8R^2$ to achieve a current gain in the speaker at resonance over the current flowing through the speaker without the network in the circuit. The same reasoning applies to the network 16B that is stated above relative to network 16A.

Figure 4:
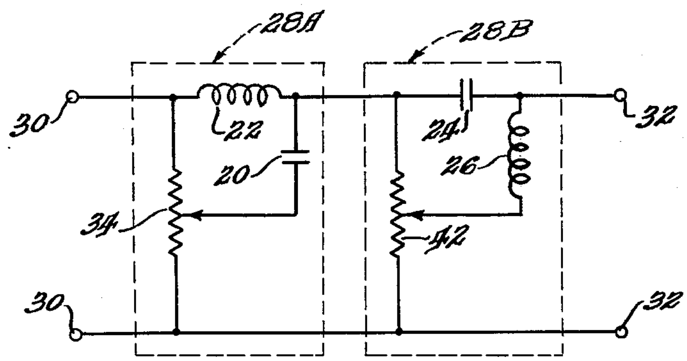
FIGURE 4 is an electrical circuit diagram of another embodiment of an impedance matching circuit suitable for use in the sound reproducing device illustrated in FIGURE 1.

The coupling network 16 may be replaced by the network illustrated in FIGURE 4. In FIGURE 4, the network employs two portions 28A and 28B connected in cascade. The portion 28A is equivalent to the portion 16A and employs an inductor 22 connected in series between the input terminals 30 and the output terminals 32 of the network which is identical to the inductor 22 of portion 16A. A continuously variable tapped resistor 34 is connected between the input terminals 30, and a capacitor 20 identical to the capacitor 20 of section 16A is connected between the tap of the resistor 34 and the end of the inductor 22 opposite the input terminals.

Figure 5:
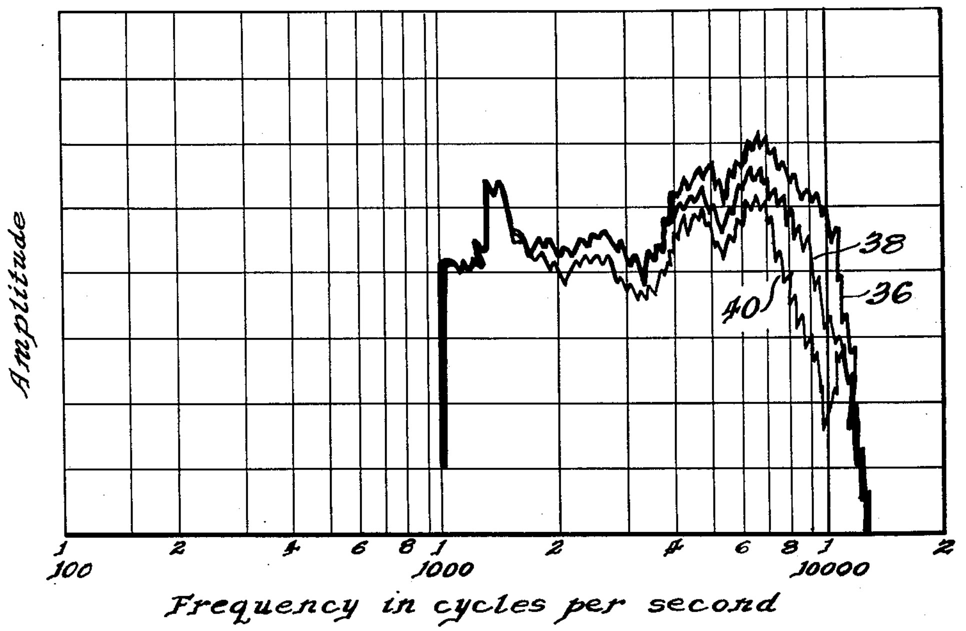
FIGURE 5 is a graph illustrating the high frequency response of a sound reproducing device employing the coupling network illustrated in FIGURE 4, the response below 1000 cycles per second being omitted from the curve.

When the tap of the resistor 34 is moved to the end of the resistor opposite the inductor 22, the portion 28A of the coupling network illustrated in FIGURE 4 approximates the portion 16A of the coupling network illustrated in FIGURE 1, and maximum power is transferred to the speaker in the range of frequencies affected by the matching or coupling network. This condition is illustrated in curve 36 of FIGURE 5. When the tap of the resistor 34 is located at some point approximately midway between the extremes of the resistor, the terminal impedance is essentially unaltered and the high frequency response of the system is approximately the same as it would be if no coupling network were employed. This condition is illustrated by curve 38 of FIGURE 5. When the tap of the resistor 34 is located at the end of the resistor adjacent to the inductor 22, the capacitor 20 is connected in parallel with the inductor. The circuit now has become a parallel resonant circuit in series with the loudspeaker 14. At the frequency of resonance of the parallel circuit, the impedance between the input terminals increases, decreasing the power delivered to the loudspeaker 14. This condition is illustrated by curve 40 of FIGURE 5.

The portion 28B of the coupling network of FIGURE 4 corresponds to the portion 16B of the coupling network of FIGURE 1. A capacitor 24 identical to the capacitor 24 of FIGURE 1 is connected between the inductor 22 and one of the output terminals 32. A continuously variable resistor 42 is connected from the side of the capacitor 24 opposite the output terminal 32 to the other output terminal, and the tap of the resistor 42 is connected to the opposite side of the capacitor 24 through an inductor 26. The inductor 26 is again identical to the inductor 26 of the coupling network of FIGURE 1. Adjustment of the terminal impedance between terminals 30 throughout the lower frequency portion of the response of the sound reproducing device is achieved by adjustment of the variable resistor 42 in a manner analogous to that described above for the high frequency portion of the response range.

It is to be understood that specific low pass filters have been disclosed for portions 16A and 28A of the coupling network for the purpose of adjusting the terminal impedance at the input of the coupling network to approximately the nominal terminal impedance value of the loudspeaker in the high frequency portion of the range of the loudspeaker. Other conventional low pass filters may also be employed for this purpose within the spirit of the present invention. Likewise, specific high pass filters have been disclosed for the portions 16B and 28B of the coupling network for the purpose of adjusting the impedance of the portion of the loudspeaker range in which resonance of the cone occurs to that of the nominal value of the terminal impedance of the speaker. Other conventional high pass filters can also be employed for this purpose. It is, however, clear that the particular high and low pass filters here described perform their functions in a particularly satisfactory manner and are simple and inexpensive to construct. It is, therefore, intended that the scope of the present invention be not limited by the foregoing disclosure, but rather only by the appended claims.

The invention claimed is:

1. A sound reproducing device adapted to be connected to the output of an audio amplifier comprising a speaker having a terminal impedance approximately equal to the output impedance of the amplifier over a first portion of its frequency range and having an impedance rising with frequency in a second higher frequency portion of its frequency range, and a coupling network having a capacitor connected in parallel with the speaker, and in inductance connected in series with the speaker, the capacitor, inductance, and speaker being resonant at a frequency in the second portion of the frequency range of the speaker, and the ratio of the inductance to the capacitance being less than 0.8 times the square of the speaker impedance in the first portion of its frequency range.

2. A sound reproducing device adapted to be connected to the output of an audio amplifier having an output impedance of approximately 16 ohms comprising a speaker having a terminal impedance of approximately 16 ohms over a first portion of its frequency range below 1000 cycles per second and having an impedance rising with frequency in a second portion of its frequency range above 1000 cycles per second, and a coupling network connected in series with the speaker having a capacitor of approximately 1.5 microfarads connected in parallel with the speaker and an impedance of approximately 0.23 millihenry connected in series with the speaker, the inductance, capacitor, and speaker being resonant at a frequency in the second portion of the frequency range of the speaker.

3. A sound reproducing device adapted to be connected to the output of an audio amplifier comprising a speaker having a terminal impedance approximately equal to the output impedance of the amplifier over a first portion of its frequency range and having an impedance rising with frequency in a second higher frequency portion of its frequency range, and a coupling network having an inductance connected in series with the speaker, a resistor connected between the end of the speaker remote from the inductance and the end of the inductance remote from the speaker and having a movable tap, and a capacitor connected between the junction of the inductance and the speaker and the tap of the resistor, the inductance, capacitor, and speaker being resonant at a frequency in the second portion of the frequency range of the speaker, and the ratio of the inductance to the capacitance being less than 0.8 times the square of the speaker impedance in the first portion of its frequency range.

4. A sound reproducing device adapted to be connected to a speaker having a terminal impedance approximately equal to the nominal terminal impedance of the speaker over a first portion of the frequency range of the speaker and an impedance rising with frequency in a second higher frequency portion of the frequency range of the speaker comprising an audio amplifier having a fixed nominal load impedance approximately equal to the terminal impedance of the speaker in the first portion of its frequency range, and a coupling network having an inductance connected in series with the output of the amplifier, and a capacitor connected to the end of the inductance remote from the amplifier and to the amplifier output remote from the inductance, said capacitor, inductance and speaker being resonant at a frequency in the second portion of the frequency range of the speaker, and the ratio of the inductance to the capacitance being less than 0.8 times the square of the speaker impedance in the first portion of its frequency range.

5. A sound reproducing device adapted to be connected to the terminals of a dynamic loudspeaker having a nominal terminal impedance of approximately 16 ohms comprising an audio amplifier having a two terminal output with a nominal load impedance of approximately 16 ohms, and a coupling network comprising an inductance of 0.23 millihenry connected to one terminal of the audio amplifier, and a capacitor of 1.5 microfarads connected between the end of the inductance remote from the amplifier and the other output terminal of the amplifier, the inductance, capacitor and loudspeaker being a series resonant circuit at a frequency near the upper limit of the range of the loudspeaker.

6. A sound reproducing device adapted to be connected to the terminals of a speaker having a relatively constant terminal impedance over a first portion of its frequency range and having an impedance rising with frequency in a second higher frequency portion of its frequency range comprising an audio amplifier having a nominal load impedance approximately equal to the terminal impedance of the speaker in the first portion of the range of the speaker, and a coupling network connected in cascade with the output of the amplifier having a resistor connected across the output of the amplifier provided with a movable tap, and inductance connected in series with the output of the amplifier, and a capacitor connected from the end of the inductance remote from the amplifier to the tap of the resistor, the inductance, capacitor, and speaker being resonant at a frequency in the second portion of the frequency range of the speaker, the ratio of the inductance to the capacitance being less than 0.8 times the square of the speaker impedance in the first portion of its frequency range.

7. A sound reproducing device adapted to be connected to the output of an audio amplifier comprising a speaker having a relatively constant impedance over a first portion of its frequency range and a diaphragm resonating at a frequency in a second portion of the frequency range of the speaker lower in frequency than the first portion of the range of the speaker, and a coupling network having a capacitor connected in series with the speaker and an inductance connected in parallel with the speaker, the capacitor, inductance and speaker being electrically resonant at approximately the frequency or resonance of the diaphragm.

8. A sound reproducing device comprising the elements of claim 7 wherein the impedance of the speaker in the first range is approximately 16 ohms, the inductance is approximately 40 millihenrys, and the capacitor has a capacitance of approximately 150 microfarads.

9. A sound reproducing device adapted to be connected to the output of an audio amplifier comprising a speaker having a relatively constant impedance in a first portion of its frequency range and a diaphragm resonating at a frequency in a second portion of its frequency range lower than the first portion thereof, and a coupling network having a capacitor connected in series with the output of the amplifier, a resistor connected across the output of the amplifier provided with a movable tap, and an inductance connected between the end of the capacitor remote from the amplifier and the tap of the inductance, the capacitor, inductance and speaker being electrically resonant at approximately the frequency of resonance of the diaphragm.

10. A sound reproducing device adapted to be connected to a loudspeaker having a relatively constant impedance in a first portion of the frequency range and a diaphragm resonating at a frequency within a second portion of the frequency range lower than the first portion of the frequency range of the speaker comprising an audio amplifier having a nominal load impedance, and a coupling network connected to the output of the audio amplifier including a capacitor connected in series with the output of the audio amplifier, and an inductance connected between the end of the capacitor remote from the audio amplifier and the output terminal of the audio amplifier remote from the capacitor, the inductance, capacitor and speaker having an electrical resonant frequency approximately equal to the frequency of resonance of the diaphragm.

11. A sound reproducing device comprising the elements of claim 10 wherein the capacitor has a value of approximately 150 microfarads and the inductance a value approximately 40 millihenrys.

12. A sound reproducing device adapted to be connected to a loudspeaker having a relatively constant impedance in a first portion of the frequency range and a diaphragm resonating at a frequency within a second portion of the frequency range lower than the first portion of the frequency range of the speaker comprising an audio amplifier having a nominal load impedance, and a coupling network connected to the output of the audio amplifier including a resistor provided with an adjustable tap connected across the output of the audio amplifier, a capacitor connected in series with the output of the audio amplifier, and an inductance connected between the tap of the resistor and the end of the capacitor remote from the audio amplifier, the inductance, capacitor and the speaker having an electrical resonant frequency approximately equal to the frequency of resonance of the diaphragm.

13. A sound reproducing device adapted to be connected to the output of an audio amplifier having a nominal load impedance comprising a low pass filter for passing with negligible attenuation audio signals within a frequency range extending from the frequency of cone resonance to the frequency at which the speaker terminal impedance becomes inductive, said low pass filter being resonant in the frequency range of the speaker in which the terminal impedance of the speaker is inductive, and a high pass filter connected in cascade with the low pass filter and resonant at the frequency of mechanical cone resonance for attenuating the frequency of resonance of the speaker cone.

14. A sound reproducing device comprising the elements of claim 13 wherein the high pass filter comprises a capacitor of approximately 1.5 microfarads connected in parallel with the speaker and an inductance of approximately .23 millihenry connected in series with the speaker, and the low pass filter comprises an inductance of approximately 40 millihenrys connected in parallel with the speaker and a capacitance of approximately 150 microfarads connected in series with the speaker.

References Cited in the file of this patent

UNITED STATES PATENTS

| | | |
|---|---|---|
| 1,674,683 | Hahnemann | June 26, 1928 |

FOREIGN PATENTS

| | | |
|---|---|---|
| 452,286 | Germany | Nov. 11, 1927 |
| 282,127 | Great Britain | Dec. 29, 1927 |
| 407,405 | Great Britain | Mar. 22, 1934 |

OTHER REFERENCES

"Hi-Fi Loudspeakers and Enclosures"; by Cohen; TK–6565 L6C6 Rider Publication, Inc.; New York, N.Y.; page 154, copyright 1956.